(12) United States Patent
Dube et al.

(10) Patent No.: US 7,433,960 B1
(45) Date of Patent: Oct. 7, 2008

(54) SYSTEMS, METHODS AND COMPUTER PRODUCTS FOR PROFILE BASED IDENTITY VERIFICATION OVER THE INTERNET

(75) Inventors: Parijat Dube, Yorktown Heights, NY (US); David A. George, Somers, NY (US); Raymond B. Jennings, III, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 11/969,569

(22) Filed: Jan. 4, 2008

(51) Int. Cl.
*G06F 15/16* (2006.01)
*G06F 15/173* (2006.01)
*G06F 17/00* (2006.01)
*G06F 17/30* (2006.01)

(52) U.S. Cl. ............... 709/229; 709/223; 709/201; 726/23; 726/28

(58) Field of Classification Search ............... 709/201, 709/223, 229; 726/23, 28
See application file for complete search history.

(56) References Cited

U.S. PATENT DOCUMENTS

| | | | |
|---|---|---|---|
| 5,848,396 A | | 12/1998 | Gerace |
| 5,867,799 A | * | 2/1999 | Lang et al. ............... 707/1 |
| 6,041,311 A | * | 3/2000 | Chislenko et al. ........... 705/27 |
| 6,681,331 B1 | * | 1/2004 | Munson et al. ............ 726/23 |
| 6,687,703 B2 | * | 2/2004 | Kindo et al. .............. 707/10 |
| 6,691,106 B1 | * | 2/2004 | Sathyanarayan ............ 707/3 |
| 6,839,680 B1 | * | 1/2005 | Liu et al. ................ 705/10 |
| 7,124,353 B2 | * | 10/2006 | Goodwin et al. ........... 715/234 |
| 7,213,032 B2 | | 5/2007 | Mascarenhas |
| 7,302,480 B2 | * | 11/2007 | Lahtinen ................. 709/224 |
| 2004/0039814 A1 | * | 2/2004 | Crabtree et al. ........... 709/224 |
| 2005/0097364 A1 | * | 5/2005 | Edeki et al. .............. 713/201 |
| 2005/0234920 A1 | * | 10/2005 | Rhodes ................... 707/10 |
| 2006/0037077 A1 | * | 2/2006 | Gadde et al. .............. 726/23 |
| 2007/0061882 A1 | * | 3/2007 | Mukhopadhyay et al. ..... 726/23 |
| 2007/0117557 A1 | * | 5/2007 | Adjali et al. ............. 455/418 |

* cited by examiner

*Primary Examiner*—Kevin Bates
(74) *Attorney, Agent, or Firm*—Cantor Colburn LLP; Mark Wardas

(57) ABSTRACT

Systems, methods and computer products for profile-based identity verification over the Internet. Exemplary embodiments include a method for profiling a user on a network, the method including receiving an input of streams corresponding to network activities associated with the user, wherein the input of streams are received from one or more layers of the network, in response to receiving a request to supply specified-input, receiving a score function and a list of attributes to be monitored, classifying the input of streams into network-activity classifications, extracting values and attributes for the network-activity classifications, and placing the extracted values and attributes into data sets, calculating a score of the data sets, comparing the data sets to a database of activity-specific attributes and mapping the data sets to a class of individuals based on a value of the score and the comparison of the database of activity-specific attributes.

2 Claims, 4 Drawing Sheets

US 7,433,960 B1

SYSTEMS, METHODS AND COMPUTER PRODUCTS FOR PROFILE BASED IDENTITY VERIFICATION OVER THE INTERNET

TRADEMARKS

IBM® is a registered trademark of International Business Machines Corporation, Armonk, New York, U.S.A. Other names used herein may be registered trademarks, trademarks or product names of International Business Machines Corporation or other companies.

BACKGROUND OF THE INVENTION

1. Field of the Invention

This invention relates to classifying network activity and particularly to systems, methods and computer products for profile-based identity verification over the Internet.

2. Description of Background

Individuals all over the world interact with the Internet through different types of activities (e.g., applications, protocols, services). The behavioral dynamics of an individual in a particular Internet activity environment may be significantly different from other individuals. Each Internet activity can be characterized by a set of attributes that can be used to define features of the behavior of an individual while interacting with Internet through that activity. For example, attributes associated with Email can be: the community of the persons to which emails are normally sent; the time stamp of the emails; the length of emails; the type of attachments (doc/ppt/mpeg...); the subject of emails; the topic generally discussed; and the keywords normally used by a person (e.g., each person has his own set of vocabulary from which they normally choose words to write in emails). Furthermore, those attributes associated with Chat can be: the type of chat community a person joins; the language used in chat environments; the occurrence rate of chat messages; the amount of time a user poises between sending messages; the length of chat messages in terms of number of words; the type of community according to the time of the day; the reaction time to messages from others; the amount of time a person spends in particular chat community; and the number of concurrent chat sessions an individual participates.

Every individual has a certain personality that is a complex manifestation of the social, political, economical and educational background in which he was brought up and in which he currently resides. The word "personality" here is a broad term including an individual's intelligence level, creativity, vocabulary, interests, linguistic skills, psychological traits, experience with using computer applications, mannerisms. This personality is reflected in his day-to-day interactions with others, in his thinking, and hence in his actions in different environments and in different situations. An individual's personality also has a crucial affect on his behavior over Internet. In particular, this personality can be reflected in the values of the different internet-activity specific attributes for the individual.

SUMMARY OF THE INVENTION

Exemplary embodiments include a method for profiling a user on a network, the method including receiving an input of streams corresponding to network activities associated with the user, wherein the input of streams are received from one or more layers of the network, in response to receiving a request to supply specified-input, receiving a score function and a list of attributes to be monitored, classifying the input of streams into network-activity classifications, extracting values and attributes for the network-activity classifications, and placing the extracted values and attributes into data sets, calculating a score of the data sets, comparing the data sets to a database of activity-specific attributes and mapping the data sets to a class of individuals based on a value of the score and the comparison of the database of activity-specific attributes.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides profile-based identity verification over the Internet.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
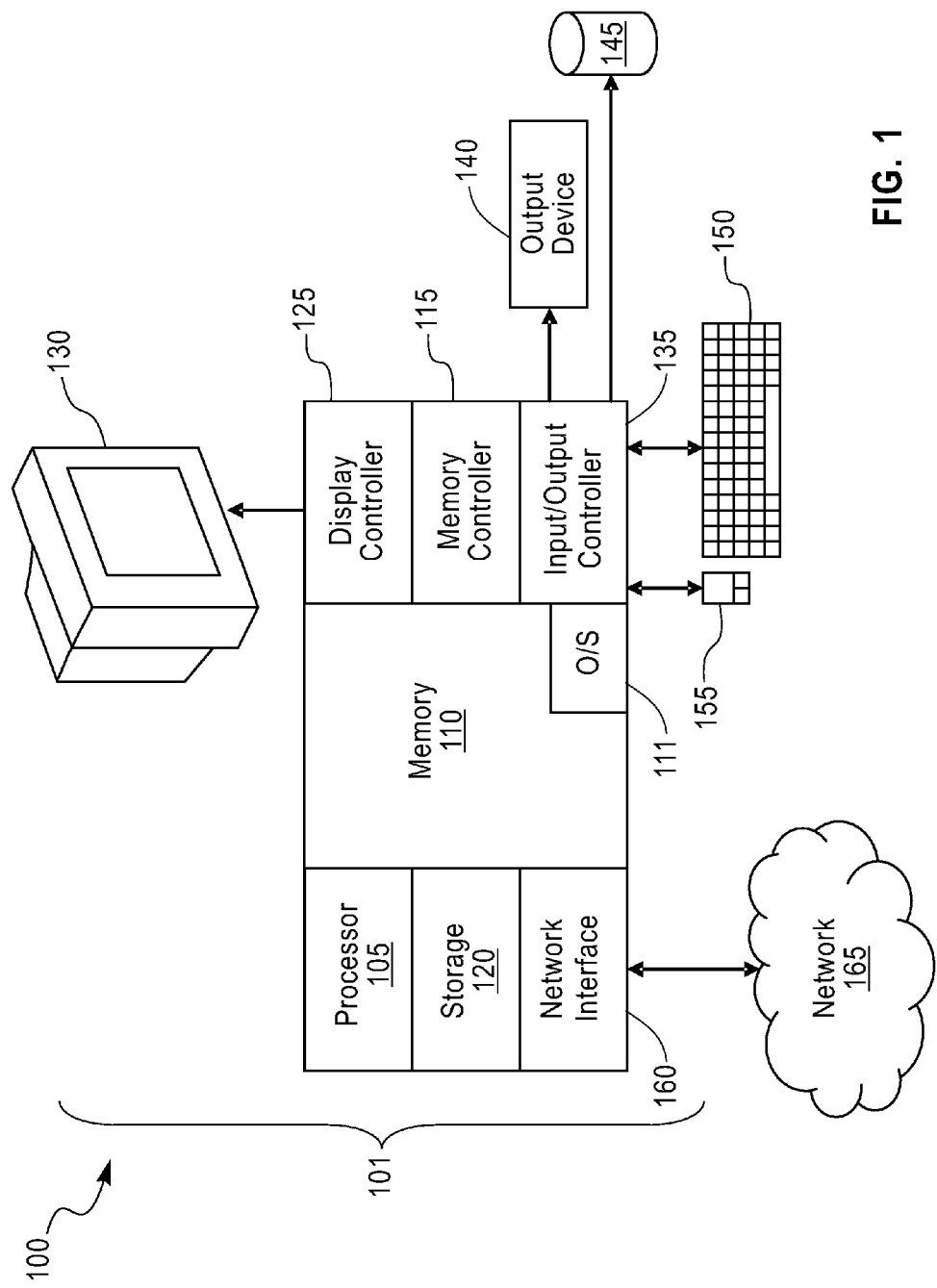
FIG. 1 illustrates an exemplary embodiment of a system for profile-based identity verification over the Internet.

The detailed description explains the preferred embodiments of the invention, together with advantages and features, by way of example with reference to the drawings.

DETAILED DESCRIPTION OF THE INVENTION

Exemplary embodiments include systems and methods that define, measure and analyze sets of attributes of an individual in an internet activity environment, which can be implemented for verifying identity. In exemplary embodiments, the systems and methods further classify individuals based on these attributes ascribed to different Internet activities. In exemplary embodiments, similar to biometrics which implement physical or behavioral characteristics (including finger prints, retina, DNA, voice patterns etc.), the attributes defined herein are based on behavioral patterns on the Internet (i.e. "netmetrics™").

In exemplary embodiments, the systems and methods described herein profile an individual based on his behavior over Internet using different activity-specific metrics and further identify an individual based on feeds from his internet activities using different activity-specific metrics. In exemplary embodiments, profiling involves defining a vector of attributes corresponding to different internet activities and then estimating the values of these attributes for an individual. The profiling can be dynamic and as the values of attributes change over time, the individual profiles are also updated. Once a repository of individual profiles is established a mapping of packets/group of packets of an individual/group of individuals based on the values of attributes carried by these packets can be performed. The attribute values can be determined by some statistical processing of packets for example, which can involve machine learning techniques like supervised learning (Neural networks, Linear Discriminant Analysis) or unsupervised learning techniques.

In exemplary embodiments, the attributes can be unique to an activity and/or independent of the activity and may just depend on the individual and/or specific to a class of activities. For example, attributes specific to Email and Chat activities are defined above. The activity-independent attributes can be linguistic skills, typing speed etc. Examples of attributes specific to a class of activities can be e.g., conversation reaction time of an individual, which may be similar in VoIP and chat environments.

In exemplary embodiments, the systems and methods described herein can be implemented by companies for profiling its employees, which can be used e.g., to identify inappropriate usage of company's network resources by non-employees (friends, spouses etc.). The systems and methods described herein can also be implemented by the government for monitoring Internet for suspicious activities. The systems and methods described herein can also be implemented to prevent identify theft, monitor surreptitious activities, and conduct studies on social behavior over Internet.

In exemplary embodiments, the systems descried herein can include a database storing activity-specific attributes. In exemplary embodiments, the attributes can be learned over time corresponding to an (e.g., activity, individual) pair. The database can be updated dynamically with new information received. The systems described herein can also include an activity Classifier. In exemplary embodiments, the activity classifier classifies the data received into the type of activity to which it corresponds. The systems described herein can also include a data-set profiler, which studies different activity logs in run-time corresponding to individual(s) and calculates values for different (perdefined) activity specific attributes from the logs. In exemplary embodiments, during run-time feeds may be from only a subset of activities and further some activity-specific attributes may not be calculated due to the time horizon of feeds, etc. The system described herein can also include a data-set mapper to map the particular data-set which was analyzed by the profiler to different (e.g., predefined and dynamically updated) categories of individuals.

FIG. 1 illustrates an exemplary embodiment of a system 100 for profile-based identity verification over the Internet. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 101, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the profile-based identity verification method described herein in accordance with exemplary embodiments and a suitable operating system (O/S) 111. The operating system 111 essentially controls the execution of other computer programs, such the profile-based identity verification systems and methods described herein, and provides scheduling, input-output control, file and data management, memory management, and communication control and related services.

The profile-based identity verification methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the profile-based identity verification methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the O/S 111, and support the transfer of data among the hardware devices. The BIOS is stored in ROM so that the BIOS can be executed when the computer 101 is activated.

When the computer 101 is in operation, the processor 105 is configured to execute software stored within the memory 110, the communicate data to and from the memory 110, and to generally control operations of the computer 101 pursuant to the software. The profile-based identity verification methods described herein and the O/S 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The profile-based identity verification methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readably medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disk read-only memory (CDROM) (optical). Note that the computer-readable medium could even be paper or another suitable medium upon which the program is printed, as the program can be electronically captured, via for instance optical scanning of the paper or other medium, then complied, interpreted or otherwise processed in a suitable manner if necessary, and then stored in a computer memory.

In exemplary embodiments, where the profile-based identity verification methods are implemented in hardware, the profile-based identity verification methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initialed on the computer 101. The processes can further monitor which and how many other machines can control the computer 101 either locally or remotely. In exemplary embodiments, the processes can also inquire or accept a grace period input by a user of the computer 101. The grace period can be a time period after which all traffic to and from the computer ceases if no further activity has been sensed by the processes. In this way, if a user has left the computer 101 for an extended period of time or has left the computer (e.g., after a work day) the computer 101 no longer allows traffic to and from the computer 101. In an alternative implementation, the computer 101 can totally power down after the grace period has expired. In further exemplary embodiments, the processes can accept traffic only from a common network maintenance control system that provides limited services.

Figure 2:
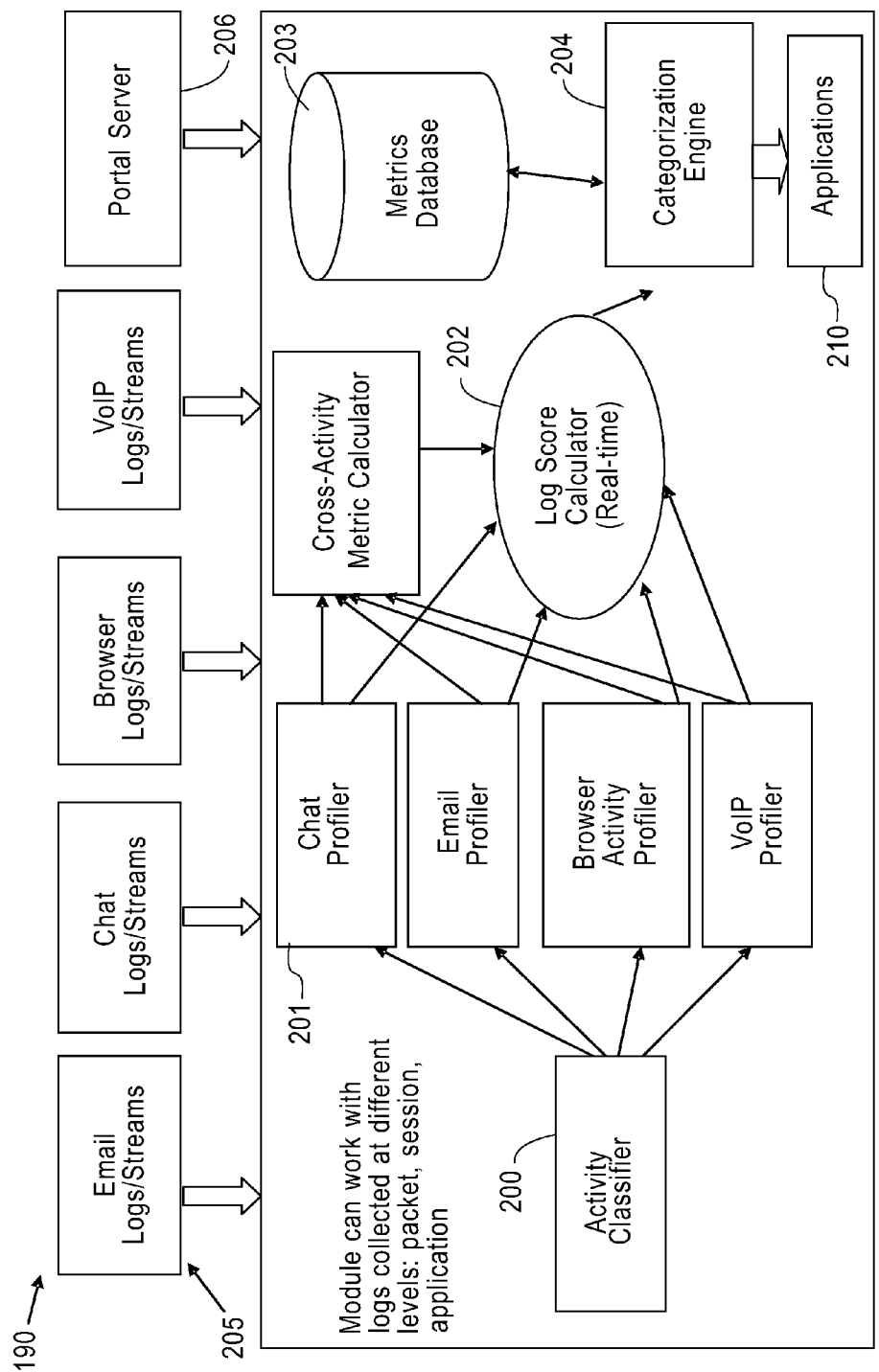
FIG. 2 illustrates a high level block diagram of a system in accordance with exemplary embodiments.

FIG. 2 illustrates a high level block diagram of a system 190 in accordance with exemplary embodiments. In exemplary embodiments, the system 190 is utilized when the categorization of a data-set involves studying cross-activity correlations of attributes and calculating a user-specified score function. An input 205 includes streams corresponding to different Internet activities, including email, chat, browser and voice over Internet Protocol (VoIP) logs/streams. In exemplary embodiments, the system 190 can also include a user portal hosted by the portal server, 206, through which the users can specify their own specific score function and their own list of attributes to be monitored. The input streams from the input 205 are classified using an activity classifier, 200, and for each Internet activity there is a corresponding a profiler, 201, which acts upon the input data-set and extracts values for the activity specific and generic attributes from the data-set. The attributes are then fed to a score calculator, 202, whose function is to calculate the score of the data-set under analysis. A cost function can also be programmed by the user through the portal. Once the score is calculated it is fed to a categorization engine, 204, which maps the data-set to a particular individual/class of individuals based on the value of the score and the database of activity specific attributes, 103.

In exemplary embodiments, the score is a utility function and can be defined differently by applications. For example, applications that are more interest in identifying individuals based on the types of web-sites of interest by a user can put more weights on the types of web-pages visited under the browser activity, on the types of web-pages discussed under the email and chat activity and 0 weights on other attributes of these activities. Some other application that is monitoring (e.g., a chat site) can put more weights on different attributes of chat activity logs and 0 on other activity logs. The score function used to calculate the score of the particular data-set may also exploit correlation of (common) attributes across activities In exemplary embodiments, the categorization engine 204 generates a dynamic profile of the data-set based on the application-specific score function. The categorization engine 204 also creates dynamic categories from the database based on the score function supplied by the application. The results from the categorization engine 204 can be fed into applications 210 tracking and/or monitoring users. The score function can also be a vector of values corresponding to different individual attributes or can be a vector of functions, each mapping a subset of attributes. Though individual attributes alone may not be sufficient to identify an individual as the attribute set of many individuals may overlap, the combined set of attributes across different Internet activities has a high probability of drilling-down to an individual. An individual can be viewed as a point in a multi-dimensional space of attributes associated with Internet activities. As richer sets of attributes for an activity and estimated values for an individual are defined, the ability to identify the individual uniquely also increases.

Figure 3:
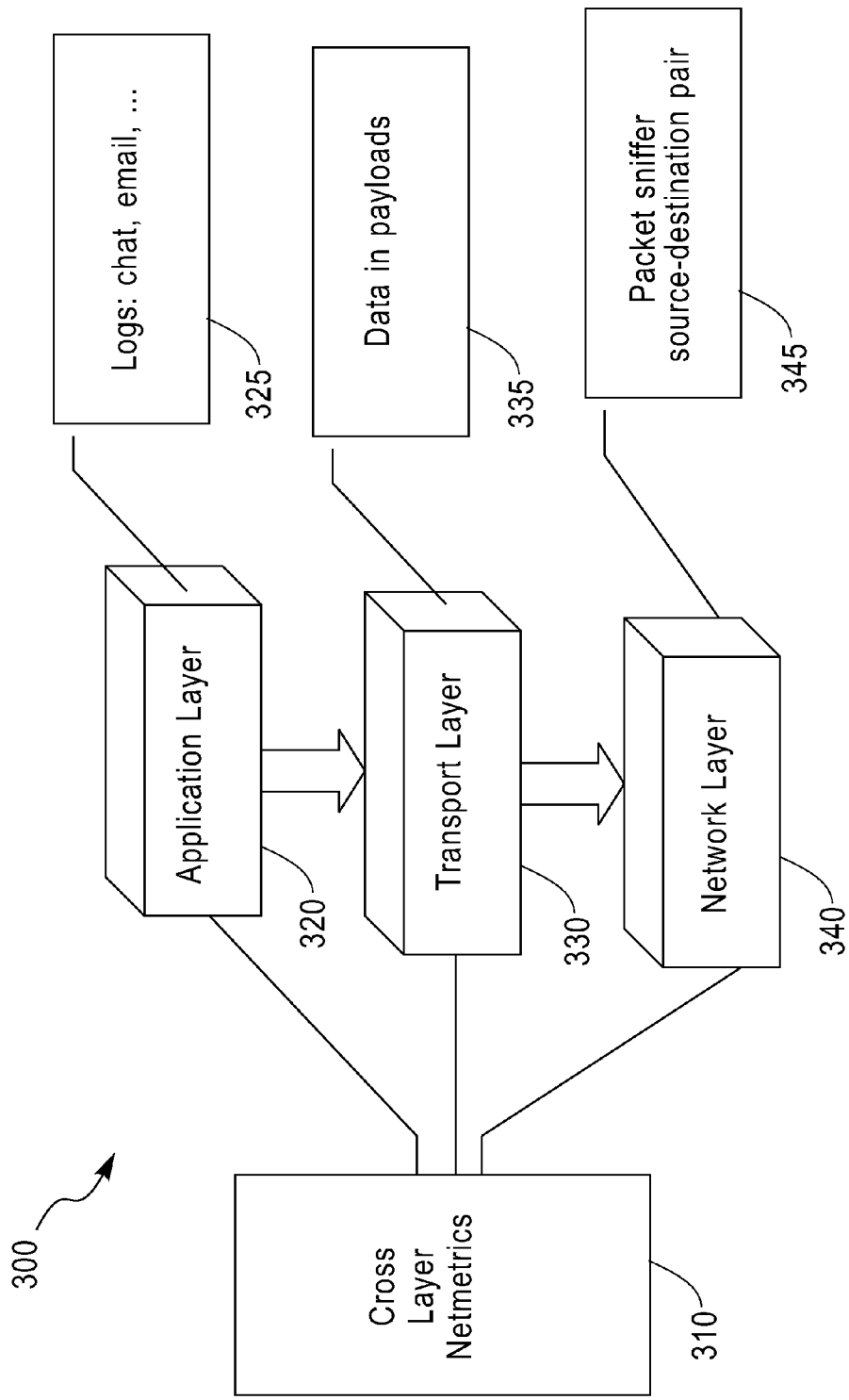
FIG. 3 illustrates a block diagram of a hierarchy of netmetrics™ in accordance with exemplary embodiments.

FIG. 3 illustrates a block diagram of a hierarchy 300 of netmetrics™ in accordance with exemplary embodiments. Cross layer netmetrics™ 300 can include certain layers of a TCP/IP stack such as an application layer 320, and corresponding applications 325, a transport layer 330, and corresponding data 335, and a network layer 24o, and corresponding network applications 345. It is thus appreciated that the systems and methods described herein can be defined and evaluated at different layers of the network.

Figure 4:
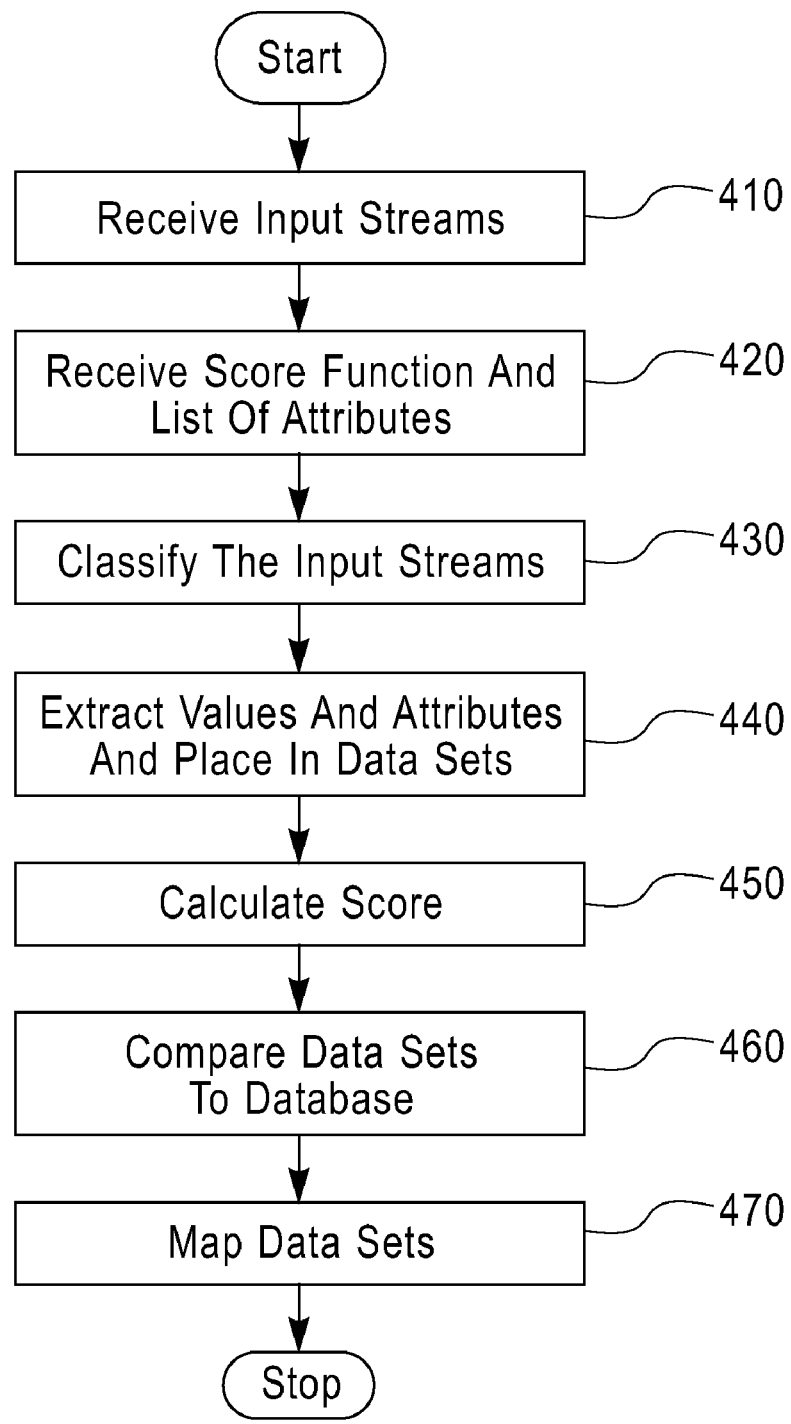
FIG. 4 illustrates a flow chart of a method of profiling a user on a network in accordance with exemplary embodiments.

FIG. 4 illustrates a flow chart of a method 400 of profiling a user on a network in accordance with exemplary embodiments. At block 410, an input of streams corresponding to network activities associated with the user is received, wherein the input of streams is received from one or more layers of the network. At block, 420 in response to receiving a request to supply specified-input, a score function and a list of attributes to be monitored is received. At block 430, the input of streams is classified into network-activity classifications. At block 440, values and attributes for the network-activity classifications are extracted and placed into data sets. At block 450, a score of the data sets is calculated. In exemplary embodiments, the score is a utility function defined by applications. At block 460, the data sets are compared to a database of activity-specific attributes. At block 470, the data sets are mapped to a class of individuals based on a value of the score and the comparison of the database of activity-specific attributes. In exemplary embodiments, the method 400 can further include generating a dynamic profile of the data set based on an application-specific score function. In further exemplary embodiments, the method 400 can further include obtaining activity logs associated with the network activities, analyzing the activity logs in run-time and calculating values for the activity-specific attributes from the activity logs.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for profiling a user on a network, the method consisting of:
    receiving an input of streams corresponding to network activities associated with the user, wherein the input of streams are received from one or more layers of the network;
    in response to receiving a request to supply specified-input, receiving a score function and a list of attributes to be monitored;
    classifying the input of streams into network-activity classifications;
    extracting values and attributes for the network-activity classifications and placing the extracted values and attributes into data sets;
    calculating a score of the data sets;
    comparing the data sets to a database of activity-specific attributes; and
    mapping the data sets to a class of individuals based on a value of the score and the comparison of the database of activity-specific attributes.

2. The method as claimed in claim 1 wherein the score is a utility function defined by applications.

* * * * *